Jan. 1, 1963  D. C. LIPS  3,071,004
FORCE BALANCE INSTRUMENT
Filed Aug. 31, 1959
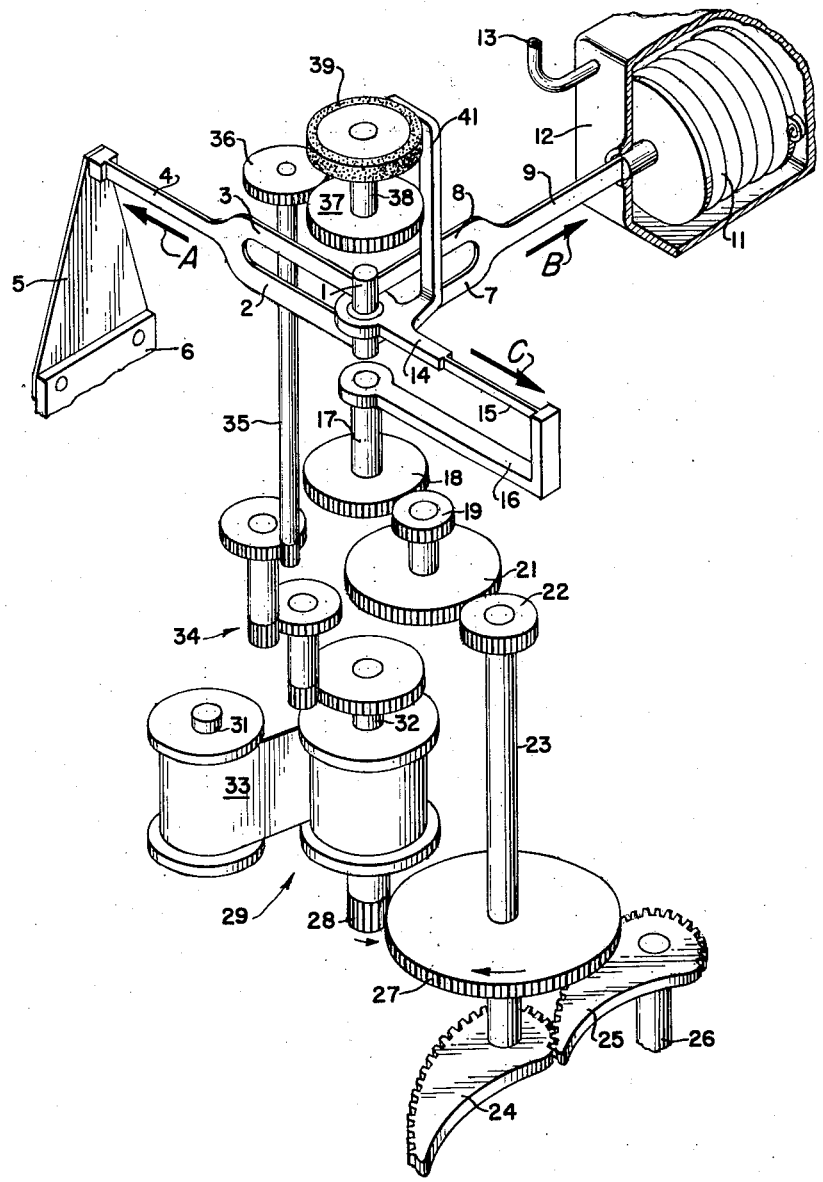
INVENTOR:
DONALD C. LIPS,
BY *Myron J. Seibold*
Attorney.

United States Patent Office 3,071,004
Patented Jan. 1, 1963

3,071,004
FORCE BALANCE INSTRUMENT
Donald C. Lips, Torrance, Calif., assignor to The Garrett Corporation, Los Angeles, Calif., a corporation of California
Filed Aug. 31, 1959, Ser. No. 837,250
1 Claim. (Cl. 73—388)

This invention relates to a force balance instrument having angularly directed forces whose resultant is balanced by a restoring force and has for its object the provision of such an instrument in which unbalance of the resultant and storing forces results in a change in the direction of application of the restoring force to a position in which balance or equilibrium of the instrument is restored.

Another object of the invention is an instrument in accordance with the preceding object wherein the forces act at substantially a common point whose position of equilibrium is in line with the axis of rotation of the restoring force which changes its direction of application to restore instrument balance.

Another object of the invention is an instrument in accordance with the preceding objects having motor means for effecting rotation of the restoring force about said axis when unbalance occurs.

Another object of the invention is an instrument in accordance with the immediately preceding object in which the motor is constantly biased to rotate but is held thereagainst when said point of force action is in its equilibrium position aligned with the axis of rotation of the restoring force.

Another object of the invention is a force balance instrument having angularly directed forces whose resultant is balanced by a restoring force having its direction of application rotated to restore instrument balance when the relative value of said angularly directed forces changes and which controls the release of a relatively large force by a much smaller control force constituting one of said angularly directed forces.

Another object of the invention is a force balance instrument having a floating element to which are applied a substantially constant force, a condition responsive force positioned at an angle thereto, and a restoring force opposing the resultant of the constant and condition responsive forces, with the angular position of the restoring force being changed to return the element to its position of equilibrium as the condition responsive force changes and with the change in angular position of the restoring force giving an instrument readout of the value of the condition.

A further object of the invention is a force balance instrument in accordance with the preceding object provided with motor means for effecting rotation of the restoring force and in which the motor means is maintained inoperative while the floating element is in its equilibrium position aligned with the axis of rotation of the restoring force.

Other objects and features of the invention will be readily apparent to those skilled in the art from the following specification and appended drawing illustrating a certain preferred embodiment in which:

The FIGURE is a perspective, schematic representation of a force balance instrument according to the invention.

In the single FIGURE of the drawing the invention has been illustrated, in a specific embodiment in accordance with the requirements of the patent statutes, as an instrument responsive to altitude pressure and having particular utility in providing values of that condition for use in a dropsonde; for example where an instrument broadcasting meteorological data is dropped by parachute from a considerable altitude and in which the condition responsive force is thus derived from an increasing atmospheric pressure as the instrument descends.

It will, of course, be understood that the force balance instrument of the invention has many fields of application and is not responsive only to altitude or other pressures, but is intended for application to force balancing generally and to indications of any condition change which may be resolved into a proportional force.

In the specific illustration of the drawing, there is shown a floating shaft 1 to which is connected the bifurcated end 2, 3 of a flexible arm 4 connected to a force applying sheet spring 5 mounted on a fixed support 6. At substantially right angles to this connection, the bifurcated end 7, 8 of a flexible arm 9 connects the shaft 1 to an evacuated bellows 11 mounted within a pressure chamber 12 having a connection 13 to static or atmospheric pressure. Journalled on the shaft 1 between the bifurcations 2, 3 and 7, 8 is an arm 14 connected by a flexible connection 15 to a second arm 16 fixedly mounted on a shaft 17 rotating within fixed bearings, not shown. The shaft 17 is connected through gears 18, 19, 21 and 22 to an output shaft 23 connected through linearizing cam gears 24 and 25 to an instrument readout shaft 26.

Rigid with the shaft 23 is a gear 27 meshing with the shaft gear 28 of a spring motor generally indicated at 29. The spring motor 29 is comprised of a pair of rotating shafts 31 and 32 carrying a spring strap 33 which is wound to rotate the shaft 32 and gear 28 in a counterclockwise direction as viewed in the figure. The shaft 32 is also connected through a gear train indicated generally at 34 to a shaft 35 in turn connected through a pair of gears 36 and 37 and a shaft 38 to a brake wheel 39 engaged by a brake arm 41 extending from the arm 14 which rotates on the shaft 1. The axes of shafts 17 and 38 are in alignment as is also the axis of the shaft 1 when the instrument is in its balanced or equilibrium position.

The instrument as shown in the figure is in its balanced or equilibrium position and with the condition responsive pressure at a minimum, that is, in the specific embodiment explained, with the instrument at maximum altitude. The sheet spring 5, through the flexible arm 4, exerts a substantially constant force upon the shaft 1 in the direction represented by the heavy arrow A. The bellows 11 will exert a force upon the shaft 1 in the direction indicated by the heavy arrow B, but since the altitude pressure is at a minimum, the restoring force represented by the heavy arrow C is substantially aligned with the spring force A, with the shaft 1 in its equilibrium position aligned with the shafts 17 and 38. In this equilibrium position, the brake arm 41 engaging the brake wheel 39 prevents rotation of the motor 29.

While in the figure, the engagement of brake arm 41 and brake wheel 39 has been shown as frictional, it will be understood that this braking may as well occur by interference, such as from a toothed wheel and an engaging arm projection.

As the pressure within the chamber 12 increases with decreasing altitude, the bellows 11 will increase the pressure force B and the floating shaft will be displaced toward the bellows, with this movement permitted through the flexible connections 4 and 15. The brake arm 41 now leaves brake wheel 39 and the motor 29 is free to rotate output shaft 23 and, through the gear train 18, 19, 21, 22, the shaft 17 to which is rigidly connected the arm 16. This also rotates the arm 14 about the shaft 1 until the restoring force C again balances the resultant of spring force A and pressure force B. At balanced position, shaft 1 is again aligned with the shafts 17 and 38 and the brake arm 41 again engages the brake wheel 39 to stop the motor 29.

Thus, as the pressure force B increases, the change in the resultant of constant spring force A and pressure force B causes a change in the angular position of the restoring force C to balance the resultant. This returns the instrument to its balanced or equilibrium position and brakes the motor 29 to a stop. This rotation of the restoring force C will, through the connection of shaft 23 to the linearizing cam gears 24 and 25, give an instrument readout at shaft 26 indicating the value of the force B and the condition to which it is responsive in units determined by the shape of the cam gears.

While a certain preferred embodiment of the invention has been specifically disclosed, it is understood that the invention is not limited thereto, as many variations will be readily apparent to those skilled in the art and the invention is to be given its broadest possible interpretation consistent with the prior art.

What is claimed is:

A force balance instrument for indicating the relative value of a unidirectionally changing pressure which comprises: means defining an axis for lateral displacement from an equilibrium position in response to concurrent forces applied thereto; means for producing a substantially constant force including a flexible arm connected with said axis defining means for applying said constant force thereto; means for producing a second force proportional to said changing pressure including a second flexible arm for applying said second force to said axis defining means at an angle of substantially ninety degrees to the direction of application of said constant force; a reaction member operatively connected with said axis defining means to exert a force thereon equal to the resultant of said constant force and said second force, said member being journaled for rotation about the equilibrium position of said axis; motor means biased to rotate said reaction member in the direction of motion of said resultant as said second force changes; brake means responsive to the position of said axis defining means and cooperative with said motor means to prevent rotation of said reaction member when said axis is in said equilibrium position and to permit such rotation when said axis is displaced from said position; and scale conversion means drivingly connecting said motor means with a readout shaft thereby to convert the rotation of said reaction member to an indication of the value of said second force relative to said constant force with reference to a desired scale.

References Cited in the file of this patent

UNITED STATES PATENTS

| | | |
|---|---|---|
| 2,257,905 | Gorrie | Oct. 7, 1941 |
| 2,352,312 | Donaldson | June 27, 1944 |
| 2,427,235 | Smoot | Sept. 9, 1945 |
| 2,538,824 | Andresen | Jan. 23, 1951 |
| 2,608,051 | Nettel | Aug. 26, 1952 |
| 2,652,813 | Reuter et al. | Sept. 22, 1953 |

FOREIGN PATENTS

| | | |
|---|---|---|
| 681,544 | Germany | Sept. 25, 1939 |